United States Patent
Naaktgeboren et al.

[19]

[11] Patent Number: 5,826,810
[45] Date of Patent: Oct. 27, 1998

[54] FEEDER MEANS FOR A FORAGE HARVESTER

[75] Inventors: Adrianus Naaktgeboren, Varsenare; Dirk Johan Desnijder, Wondelgem, both of Belgium

[73] Assignee: New Holland North America, Inc., New Holland, Pa.

[21] Appl. No.: 827,082

[22] Filed: Mar. 26, 1997

[30] Foreign Application Priority Data

Mar. 27, 1996 [GB] United Kingdom .................... 9606404

[51] Int. Cl.⁶ ...................................................... B02C 18/22
[52] U.S. Cl. ................................................................ 241/222
[58] Field of Search ........................................ 56/14.5, 13.3, 56/14.1, 14.2, 14.3; 241/222, 101.742

[56] References Cited

U.S. PATENT DOCUMENTS 4,044,557  8/1977  Strossel et al. .
4,278,211  7/1981  Shriver ................................... 241/222

FOREIGN PATENT DOCUMENTS 656172  7/1995  European Pat. Off. .

*Primary Examiner*—Mark Rosenbaum
*Attorney, Agent, or Firm*—Frank A. Seemar; Larry W. Miller; J. William Stader

[57] ABSTRACT

A forage harvester is provided with a front unit, comprising a rotatable cutterhead to which crop material is fed by stationary lower feedrolls and movable upper feedrolls. The latter are journalled in a pair of bearing housings, connected to load arms, which are linked to crank arms pivotally attached to a feeder frame. Each load arm has a protruding member to which a spring is attached for compressing incoming crop material to an even mat. The springs also push the upper feedrolls rearwardly to compensate the reaction forces from the material flow and prevent excessive wear of the feedroll axles at their passage through the feeder frame.

12 Claims, 2 Drawing Sheets

FEEDER MEANS FOR A FORAGE HARVESTER

FIELD OF INVENTION

The present invention relates generally to forage harvesters, and more particularly to means for feeding crop material towards a rotating cutterhead, said means comprising a movable portion which is loaded for compressing the incoming material into an even mat.

BACKGROUND OF THE INVENTION

A forage harvester usually is equipped with a detachable crop collecting apparatus, such as a row crop attachment or a pick-up device, which takes the crop off the field and feeds it to the inlet of the front unit of the forage harvester. In order to obtain good chopping quality, i.e. comminution of the crop material to a constant chop length, an even mat of crop material has to be fed at a constant speed towards the cutterhead to be comminuted between the rotating knives of the cutterhead and a stationary shearbar. The chopped material is led into a blower unit with paddles, which throw it into up a discharge spout for collection in a cart or container.

Commonly, the mat of crop material is formed between stationary lower feedrolls and upper feedrolls, which are mounted for vertical movement inside the front unit and are forced downwardly by a pair of springs for compression of the crop incoming material. The upper and lower feedrolls are driven to grasp the crop material and feed it rearwardly to the cutterhead. The reaction forces of this material pull the movable upper feedrolls forwardly, such that their axles may engage the edges of the vertical housing apertures through which they extend.

In the front unit described in European Patent No. 656,172, the upper rolls are pushed downwardly by a pair of load arms which are pivotally connected to crank arms, which are connected to a pair of springs. No means are provided for positively controlling the forward position of the feedrolls axles, such that during operation they are pulled vigorously against the forward edges of the apertures. Consequently, this configuration is subject to excessive wear of these axles.

The feedroll arrangement of U.S. Pat. No. 4,044,557, issued Aug. 30, 1977 in the name of Herman V. Stroessel, et al, comprises a pair of mounting plates for the axles of the upper feedrolls. Each plate is pulled downwardly by a pair of springs extending downwardly and rearwardly to the frame of the cutterhead. This structure diminishes the forward effect of the reaction forces from the crop material, such that premature wear may be prevented, but also constitutes a hindrance to cleaning and servicing operations because the springs have to be disconnected before access can be gained to the inside of the feedroll unit. If this spring arrangement would have been incorporated into a front unit according to European Patent No. 656,172, discussed above, it would have been impossible to pivot the upper feedroll portion down to its service position unless the springs were loosened first.

SUMMARY OF THE INVENTION

Therefore it is an object of the present invention to deal with the problems mentioned above and to provide a load structure for movable feedrolls, which on the one hand precludes excessive wear of the feedroll axles and on the other hand does not substantially hinder the removal of feeder portions for cleaning and servicing operations.

According to the present invention contemplates improvements to a forage harvester having a main frame, cutterhead frame means mounted thereto and enclosing a rotatable cutterhead operable to comminute crop material, feeder means mounted in the cutterhead frame means and operable to convey crop material rearwardly towards the cutterhead along a crop feeding path, and a load structure. The load structure comprises a load arm having a pivot point which is movable to the cutterhead frame means, a connection point at which the load arm is linked to a movable portion of the feeder means, and resilient means acting on the load arm for forcing the movable portion towards the crop feeding path. More particularly, the improvement contemplates the resilient means being linked to the load arm at a load point distant from the pivot point for simultaneous generation of a moment about the pivot point, which moment forces the movable portion rearwardly towards the cutterhead.

Preferably the load point lies on a forwardly extending member of the load arm. When the other end of the resilient means is linked to a front portion of the cutterhead frame, it is possible to detach this front portion with the feedrolls and the load structure mounted thereto without loosening or disassembly of the resilient means. Advantageously, the position of the pivot point of the load arm may be controlled by a crank arm attached to the frame, as the arm bears a portion of the spring forces when the feedrolls are in their extreme position. Thus are limited the forces of the feedrolls on the crop material, even when high quantities are fed to the cutterhead.

Uncontrolled movement of the feeder rolls may be prevented by attaching damping means, such as hydraulic shock absorbers, to the bearing housings of the feedrolls. The other end of such damping means may be connected to the load arm and preferably to its protruding member to damp the oscillation of the bearing housing about the connection point to the load arm. A further damping means may be mounted between the bearing housing and the frame to damp the movement of the feedrolls to the cutterhead frame.

The foregoing and other objects, features and advantages of the invention will appear more fully hereinafter from a consideration of the detailed description which follows, in conjunction with the accompanying sheets of drawings wherein one principal embodiment of the invention is illustrated by way of example. It is to be expressly understood, however, that the drawings are for illustrative purposes and are not to be construed as defining the limits of the invention.

DESCRIPTION OF THE PREFERRED EMBODIMENT

Figure 1:
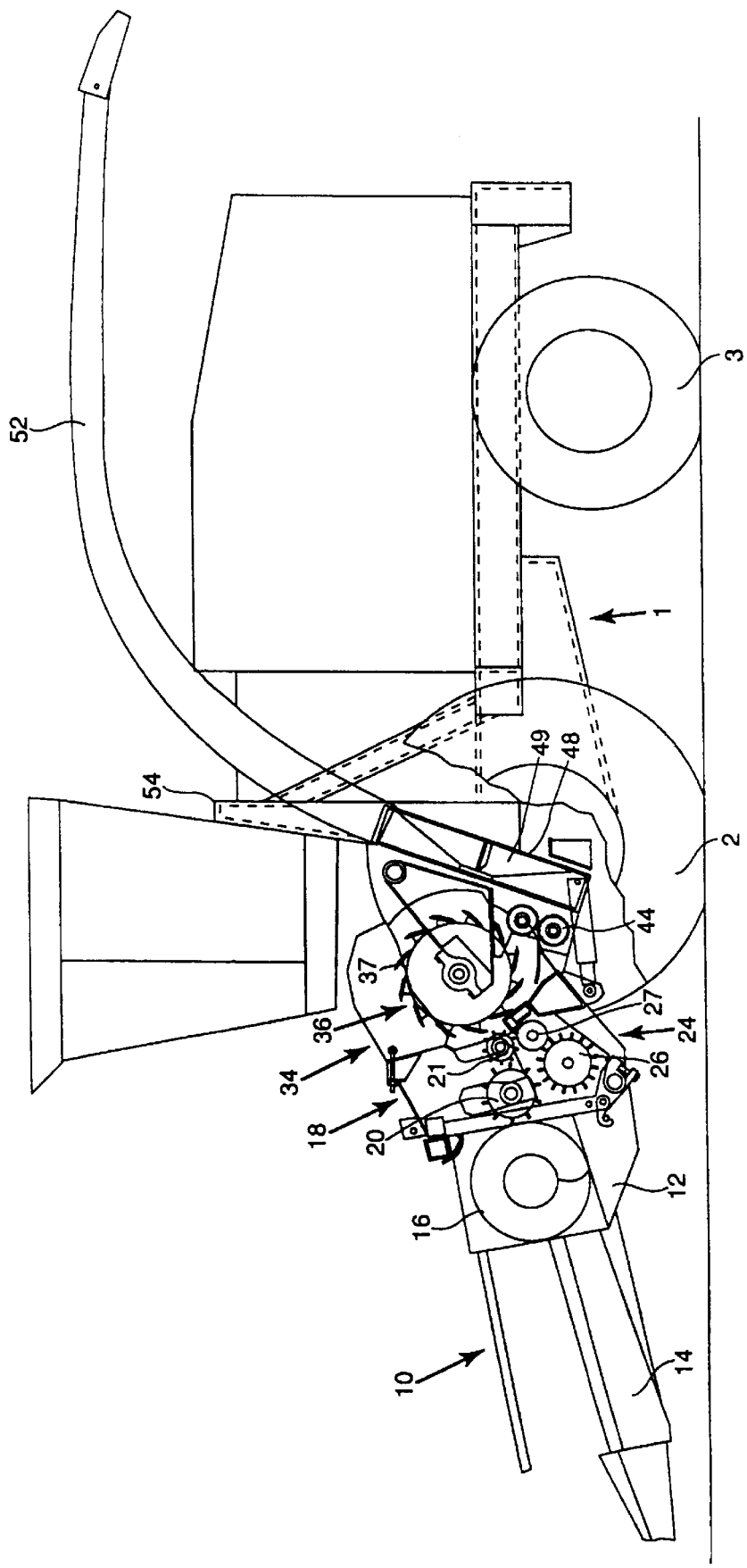
FIG. 1 is a side elevational view of a forage harvester, comprising a front unit mounted to a main frame and a crop collecting apparatus.

FIG. 1 shows a forage harvester having a main frame 1 to which are mounted ground engaging traction wheels 2 and steering wheels 3. The forage harvester is shown equipped with a crop collecting apparatus, in the form of a row crop attachment 10, suitable for the harvesting of corn, but which can be replaced with a conventional windrow pick-up device or a conventional cutter bar attachment, depending on the type of crop to be harvested. Customarily the row crop attachment 10 comprises an attachment frame 12, which supports a plurality of row crop units 14, operable to harvest corn stalks from the field and to convey the same rearwardly to an auger 16 which in its turn delivers the crop material to the bite of feeder means installed in a front unit of the forage harvester.

Figure 2:
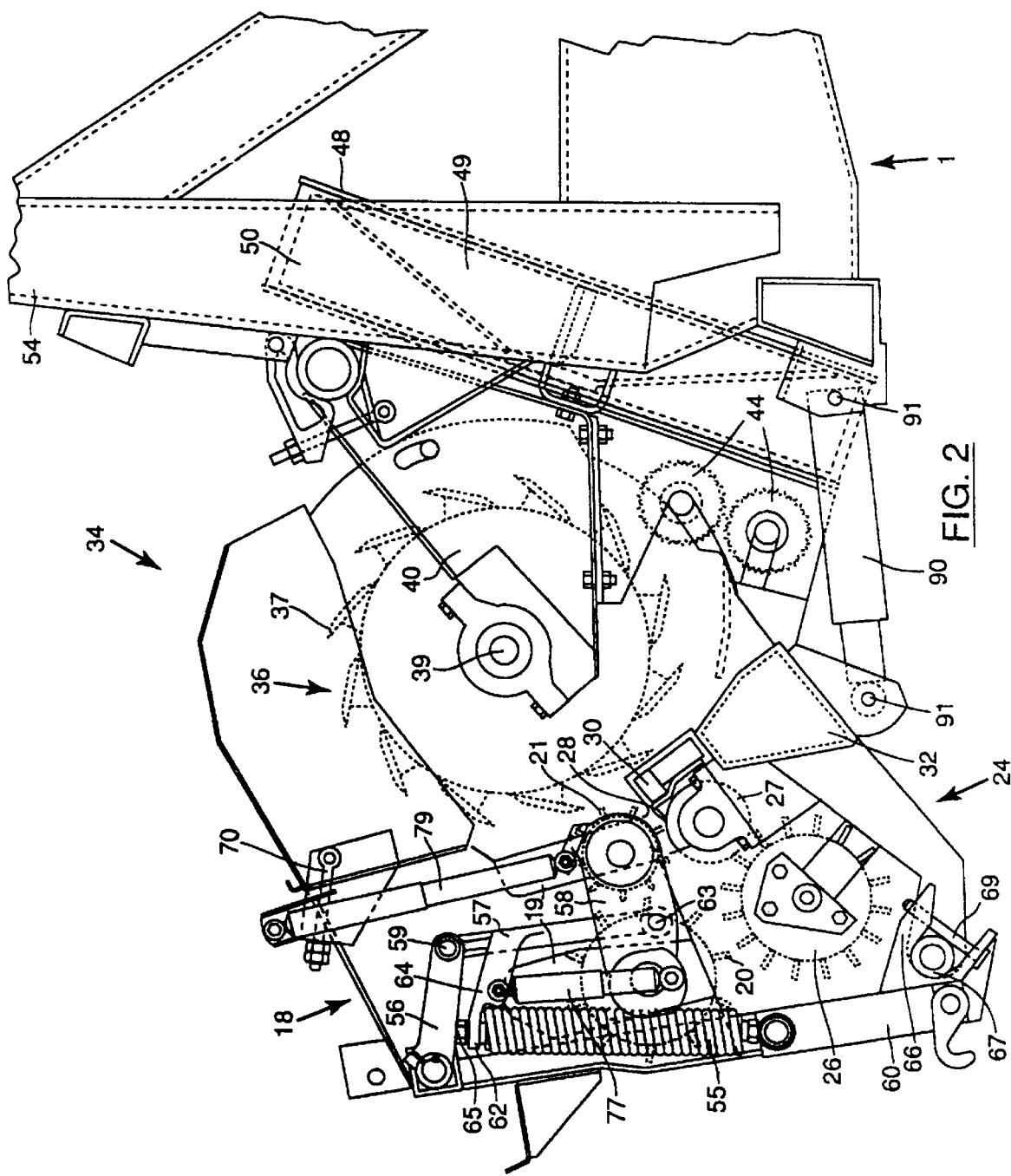
FIG. 2 is an enlarged side view of a portion of the main frame and of the front unit.

As shown in FIG. 2, said feeder means comprise lower feeder means, constituted by a front lower feedroll 26, and a smooth, rear lower feedroll 27, and upper feeder means, constituted by a front upper feedroll 20 and a rear upper feedroll 21. The lower feedrolls 26, 27 are rotatably mounted in a lower feeder frame 24 and the upper feedrolls 20, 21 are mounted in an upper feeder frame 18, to which the row crop attachment 10 is attached. The feedrolls 20, 21, 26, 27 rotate to convey the crop material along a crop feeding path between the upper and lower feeder means to a cutterhead 36 which comprises a plurality of knives 37, generating a cylindrical peripheral shape or profile when the cutterhead 36 is rotated. The latter is rotatably mounted in a cutterhead frame 34 to which the upper and lower feeder frames 18, 24 have been attached. The knives 37 cooperate with a fixed shearbar 30 to cut the crop material to length and project it into the bite of a set of counter-rotating crop processor rolls 44, which crack any kernels which may be left in the chopped material and deliver the whole to a blower rotor 49 which is installed within a blower housing 48, attached to vertical beams 54 of the main frame 1. The blower rotor 49 comprises a plurality of paddles 50, which throw the material upwardly through the blower outlet into a discharge spout 52 (FIG. 1), which can be positioned by an operator to direct the cut crop material as required, normally into a wagon which is moving alongside or behind the forage harvester.

As shown in FIG. 2, the upper feeder frame 18 comprises left and right hand sides, each having two substantially vertical apertures 19. Therein are held the axles of the upper feedrolls 20, 21. The outer ends of said axles are received in bearing housings 58, which are movably linked to the upper feeder frame 18 by left and right hand sets of crank arms 56 and load arms 57. The crank arms 56 are mounted for pivotal movement to a front portion 60 of the upper feeder frame 18, which registers with the outlet of the row crop attachment 10. The rear end of each arm 56 is hingeably linked at a pivot point 59 to the load arm 57, whereof the lower end is pivotally mounted at a connection point 63 to the bearing housing 58. The connection point 63 lies below the line interconnecting the axes of the feedrolls (20,21). Upward movement of the upper feeder rolls 20, 21 raises the load arms 57 and pivots the crank arms counter-clockwise as seen in FIG. 2.

Each load arm 57 comprises a substantially forwardly extending member 64 having at its front end a load point 62 to which is mounted the upper end of a helical spring 55, whereof the lower end is pivotally mounted to the sides of the front portion 60 of the upper feedroll frame 18. The pull force of the spring 55 on the load point 62 is adjustable by means of an adjustment screw 65 which links the load arm member 64 to the spring 55. The spring forces on the load points 62 push the load arms 57, the bearing housings 58 and the upper feedrolls 20, 21 downwardly to the lower feedrolls 26, 27 and, because of their moment about the pivot point 59, rearwardly to the cutterhead 36.

A motion damper 77 is installed between the front portion of the bearing housing 58, in the vicinity of the front upper feedroll 20, and the forwardly extending member 64 of the load arm 57. A further damper 79 is mounted between the rear portion of the bearing housing 58, in the vicinity of the rear upper feedroll 27, and a stud welded to the top of the upper feeder frame 18. Both dampers 78, 79 may be hydraulic shock absorbers having distinct damping characteristics when elongated or when shortened. The dampers 77, 79 substantially resist to their extension, but generate no significant resistance to their retraction.

The lower end of the front portion 60 comprises a pair of bifurcated extensions 66, fitting over a cylindric beam 67, which is affixed to the lower feeder frame 24. The bifurcated extensions 66 are pivotally secured to the beam 67 by means of a pair of pins 69.

The top of the upper feeder frame 18 is held against the cutterhead frame 34 by a pair of eyebolts 70, attached to the sides of the latter.

The lower feeder frame 24 is welded to a transverse beam 32 of the cutterhead frame 34. The rear lower feedroll 27 has a smooth surface to which is mounted a scraper 28 for removal of any crop material which might stick to it. To be effective, the clearance between the feedroll 27 and the scraper 28 should be minimal.

The cutterhead 36 rotates about an axle 39 which is journalled on cutterhead support 40 of a generally triangular shape, attached to the vertical beams 54 of the main frame 1. The cutterhead frame means, comprising the cutterhead frame 34, the lower feeder frame 24 and the upper feeder frame 18, are mounted for pivotal movement about the same axle 39. The position of this assembly relative to the main frame 1 is controlled by a pair of hydraulic cylinders 90, which are mounted with pins 91 between the transverse beam 32 of the cutterhead frame 34 and the main frame 1.

When no crop collecting apparatus is attached to the front section 60, access can be gained to the cutterhead 36 and the shearbar 30 by loosening the eyebolts 70 at the top of the upper feeder frame 18 and by tilting the latter forwardly about the cylindric beam 67. The top of the front section 60 may rest on the ground or on any kind of support placed in front of the front unit. Any crop material which might have been compressed between the upper and the lower feeder means, will immediately be released and be readily accessible for removal. Direct access is also gained to the upper feedrolls 20, 21, the front lower feedroll 26, the smooth lower feedroll 27 and the scraper 28.

As the springs 55 are tensioned between the front section 60 of the upper feeder frame 18 and the load arms 56, which equally are affixed to the frame 18 via the crank arms 56, they are moved in unison therewith, so that there is no need for their disconnection or readjustment when the frame 18 is removed from or reinstalled on the front unit. The dampers 77, 79 are mounted directly or indirectly to the upper feeder frame 18 in such manner that they do not hinder the removal of the latter from the front unit either.

During harvesting operation crop material is fed into the bite of the feeder means. The incoming material is grasped by the front feedrolls 20, 26 and compressed into a mat by the upper feedrolls 20, 21. The compacting force generated by the springs 55 increases as the bearing housings 58 are lifted higher and the springs are extended accordingly. However it is deemed advantageous to limit the downward forces on the crop flow and preclude a continuously increasing pressure on the incoming mat. This effect is obtained by using a linkage involving a crank arm 56 pivotally attached to the top of the load arm 57. When the housings 58 are lifted to the effect that the axles of the feedrolls 20, 21 extend through the upper half of the apertures 19, the crank arms 56 assume an upwardly inclined position and carry a portion of the downward forces generated by the springs 55 on the load arms 57, while the remaining portion of the forces is transmitted upon the bearing houses 58. During further lifting of the feedrolls 20, 21 the spring forces on the load points 62 increase linearly, but a growing portion thereof is transmitted upon the crank arm 56, such that the resulting forces on the bearing houses 58 and said feedrolls 20, 21 do not increase accordingly and even start diminishing near the top of the apertures 19. Hence the compression load on the incoming crop material remains limited, even when it is fed to the cutterhead 36 in huge quantities.

The upper and lower feedrolls 20, 21, 26, 27 are driven to engage the crop material and push it rearwardly along the crop feeding path. The reaction forces of this material push said feedrolls forwardly, and more particularly, tend to pivot the bearing housings 58 and the load arms 57 forwardly about the upper pivot point 59. The reaction forces are substantially proportional to the volume of material taken in per time unit and hence, as the rolls 20, 21, 26, 27 are rotated at a constant speed, to the height of the mat.

However, these forwardly directed forces are compensated by the rearward forces resulting from the action of the springs 55 on the members 64 of the load arms 57, which are pivoted backwardly by the moment about the pivot point 59. As the tension in the springs 55 is substantially proportional to the vertical displacement of the load arms 57 and the bearing housings 58, the resulting rearward forces will also increase in accordance with the height of the crop material mat. Hence it is possible to compensate the forward reaction forces over most of the trajectory of the rolls 20, 21. As the forces in the fore-and-aft direction are balanced, the axes of the upper rolls 20, 21 are not thrust vigorously against the upright edges of the apertures 19, such that the axes and the edges are not subject to premature wear as in the embodiment of European Patent No. 656,172.

It has proven effective to damp the motion of the bearing housings 58 in order to prevent random and uncontrolled movements of the upper feeder rolls 20, 21, as may follow from an uneven crop feeding pattern. Irregularities in the crop flow may throw said rolls 20, 21 upwardly, which then fall back and strike the layer of crop material. The crop flow is hampered momentarily, such that some material builds up in front of the rolls, but it resumes immediately with a slight increase of the material layer, which may suffice to throw the rolls upwardly again. Such system is inherently unstable, but in the present embodiment it is stabilized by adding the dampers 77, 79 thereto.

The dampers 77, 79 do not substantially hinder the upward movement of the feedrolls 20, 21, but slow down their downward movement, such that a hump in the material flow may pass unhindered without causing a subsequent strike on the following material mat. An increase in the mat profile first lifts the front feedroll 21, thereby shortening the first damper 77, and then the rear feedroll 21, thereby shortening the second damper 79. When the mat thickness decreases, the action of the springs 55 and the dampers 77, 79 gently lowers the feedrolls 20, 21 towards the original crop feeding path.

The upward movement of the rear feedroll 21 alone has no substantial effect on the repartition of the forces on the upper feedrolls 20, 21; both remain loaded as the total force on the connection points 63 of the bearing housings 58 has a downward and a rearward component. If only a vertical force would have been applied to the connection points 63, the raising of the rear feedroll 21 would transfer an increasing portion of this force upon the front feedroll 20, such that the mat of crop material might not be adequately compressed at the intersection of the crop feeding path with the knife path of the cutterhead 36. The present embodiment maintains a sufficient load on the rear feedroll 21 throughout all of its vertical positions.

The stability of the movable upper feedrolls 20, 21 is further enhanced by the location of the load point 59 and the connection point 63 on opposite sides of the line interconnecting the axes of the feedrolls 20, 21.

Other embodiments of the present invention can be thought of without departing from the original idea of the invention. For example, the pivot point 59 of the load arm 57 may be guided in an upright slot in the side of the upper feeder frame 18, instead of being connected to the crank arm 56. It is also conceivable to extend the load arm 57 above the pivot point 59 and to connect the spring 55 to a load point above said pivot point 59 for forcing the connection point 63 to the bearing housing downwardly and rearwardly. Otherwise, the springs 55 may also take the form of other resilient means, such as gas struts or a hydraulic pressure arrangement. Compression springs installed between the load point 62 and the upper portion of the feeder frame 18 yield comparable forces during operation. The hydraulic shock absorbers may also be replaced with other damping means, such as mechanical friction brakes.

It will be appreciated that there is provided a load structure which on the one hand reduces the forward load on and the consequent wear of the axles of the movable upper feedrolls 20, 21 and on the other hand enables a simple and quick disassembly of a portion of the feeder means for cleaning and servicing purposes. The damping means improve the stability of the upper feedrolls 20, 21 such that a steady flow of crop material is fed to the cutterhead 36.

While preferred structure in which the principles of the present invention are shown and described above, it is to be understood that the invention is not limited to such structure, but that, in fact, widely different means of varying scope and configuration may be employed in the practice of the invention.

Having thus described the invention, what is claimed is:

1. A forage harvester, comprising a main frame, cutterhead frame means mounted thereto and enclosing a rotatable cutterhead, operable to comminute crop material, feeder means, mounted in said cutterhead frame means and operable to convey crop material rearwardly towards said cutterhead along a crop feeding path, and a load structure including, a load arm having a pivot point which is movable to said cutterhead frame means, and a connection point at which the load arm is linked to a movable portion of said feeder means, and resilient means acting on said load arm for forcing said movable portion towards said crop feeding path, the improvement comprising said resilient means are linked to said load arm at a load point distant from said pivot point for simultaneous generation of a moment about said pivot point, which moment forces said movable portion rearwardly towards said cutterhead.

2. A forage harvester according to claim 1, wherein said load point is distant from said connection point and lies on a protruding member of said load arm, which member extends forwardly from between said pivot point and said connection point.

3. A forage harvester according to claim 2, wherein said resilient means further are linked to a front portion of said cutterhead frame means.

4. A forage harvester according to claim 1, wherein
said load arm is pivotally connected at said pivot point to a crank arm, which is pivotally attached to said cutterhead frame means.

5. A forage harvester according to claim 1, wherein
said movable portion comprises a front feedroll and a rear feedroll, interconnected by a bearing housing and said load arm is pivotally connected at said connection point to said bearing housing.

6. A forage harvester according to claim 5, wherein
a first damping means is installed between said bearing housing and said load arm at points distant from said connection point for damping relative movement of the movable portion to the load arm.

7. A forage harvester according to claim 6, wherein
a second damping means is installed between said bearing housing and said cutterhead frame means for damping relative movement of the movable portion to the cutterhead frame means.

8. A forage harvester according to claim 7, wherein
said first damping means is connected to said bearing housing in the vicinity of said front feedroll and said second damping means is connected to said bearing housing in the vicinity of said rear feedroll.

9. A forage harvester according to claim 7, wherein
said first and second damping means substantially restrain the movement of the front and said rear feedrolls towards the crop feeding path and substantially release the movement of said feedrolls in the opposite direction.

10. A forage harvester according to claim 6, wherein
said first damping means comprises a hydraulic shock absorber.

11. A forage harvester according to claim 5, wherein
said load point and said connection point lie on opposite sides of the line interconnecting the axes of said movable feedrolls.

12. A forage harvester according to claim 1, wherein
said movable portion comprises a set of upper feedrolls and said feeder means further comprise a set of stationary lower feedrolls.

* * * * *